United States Patent Office 2,833,814
Patented May 6, 1958

2,833,814
PREPARATION OF PERACETIC ACID

David R. V. Golding, Wilmington, Del., assignor to E. I. du Pont de Nemours and Company, Wilmington, Del., a corporation of Delaware No Drawing. Application December 18, 1952
Serial No. 326,773

8 Claims. (Cl. 260—502)

This invention relates to the preparation of peracetic acid. More particularly, it relates to the preparation of peracetic acid from acetaldehyde via the peroxide prepared by the autoxidation of acetaldehyde.

Peracetic acid is usually prepared by the reaction of high strength hydrogen peroxide with acetic anhydride or acetic acid. This method is not generally satisfactory for cost reasons and because of the exothermic nature of the reaction. Furthermore, the resulting solution of peracetic acid necessarily contains acetic acid. Since it is not safe to remove the peracetic acid from such solutions, they are used as such even though the presence of acetic acid therein may be undesirable in certain applications.

There are claims in the literature that peracetic acid may be prepared by the oxidation of acetaldehyde. It is believed that these claims are inaccurate and that the peroxide compound isolated by the procedures of the literature is actually an addition compound of peracetic acid with acetaldehyde. Young, Chemistry and Industry, 1949, page 777, discusses such earlier claims to the preparation of peracetic acid and concludes that the peroxide actually isolated from the oxidation of acetaldehyde is probably acetaldehyde hemiperacetate. Young cites the work of Lösch who isolated a peroxide of melting point 22° C. and approximate molecular weight of 105 from the oxidation product of acetaldehyde.

It is an object of the present invention to provide a method for obtaining peracetic acid from the relatively cheap raw materials, acetaldehyde and oxygen or air. A further object is a method for obtaining peracetic acid from the peroxide product obtained by the autoxidation of acetaldehyde. A still further object is to provide a method for obtaining a solution of peracetic acid in an inert solvent, such solvent being substantially free of acetic acid and acetaldehyde. Still further objects will be apparent from the following description.

It is now fairly well established as indicated below that the product obtained by the autoxidation of acetaldehyde is actually acetaldehyde hemiperacetate,

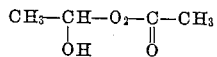

or some addition compound of peracetic acid and acetaldehyde of the same empirical formula ($C_4H_8O_4$). Accordingly, the autoxidation product is hereinafter referred to for the sake of convenience as acetaldehyde hemiperacetate, or simply as the "hemiperacetate." It should be understood, however, that in doing so, reference to the active oxygen-containing acetaldehyde autoxidation product is intended, whether or not it actually is the above hemiperacetate.

The present invention is based on the discovery that acetaldehyde hemiperacetate dissociates rapidly in the presence of basic substances to yield acetealdehyde and peracetic acid. Accordingly, the above objects are accomplished in accordance with the invention by catalyzing the dissociation of the hemiperacetate in the above component compounds by subjecting the same to the action of a basic substance and removing acetaldehyde from the reaction mixture substantially as fast as it is formed. The above dissociation reaction does not take place to any practical extent in the absence of a suitable catalyst. Moreover, when it does take place the component compounds tend to react with each other to destroy the peracetic acid and produce acetic acid. Consequently, it is necessary for the obtainment of peracetic acid as the final product to choose a suitable catalyst and to employ proper conditions for removing the by-product acetaldehyde.

One way of practicing the invention is to add a solution of the hemiperacetate in an inert solvent to a solution of a basic compound in an inert solvent, while maintaining this second solution under such temperature and pressure conditions as will effect distillation from the resulting mixture of the by-product acetaldehyde as fast as it is formed. Thus, a benzene solution of the hemiperacetate can be added continuously to a benzene solution of pyridine maintained under refluxing conditions, while continuously removing the acetaldehyde as overhead product. By such an operation, the hemiperacetate is continuously dissociated catalytically into its component compounds and the by-product acetaldehyde is continuously stripped from the reaction mixture to leave a solution of peracetic acid in the solvent as the still residue. This residual solution will be substantially free of both acetaldehyde and acetic acid.

The practice of the invention is illustrated by the following examples.

Example 1

A quantity of acetaldehyde, 96 g., was placed in a flask fitted with a gas dispersion stirrer, a thermocouple well and a gas outlet. Oxygen was passed into the flask during a period of 110 min., during which time the contents of the flask were maintained at −8° C. and were illuminated by an incandescent lamp. At the end of this time, a standard iodometric titration showed that approximately 15%, on a mole basis, of the acetaldehyde was converted to a peroxide. This peroxide was isolated in crystalline form by removing the excess acetaldehyde from the reaction mixture by vacuum distillation. After washing with Freon-12 (dichlorodifluoromethane) and drying, the crystals melted at 26° C., and gave a peroxide titration corresponding to an equivalent weight of 137, compared to a theoretical value of 120 for acetaldehyde hemiperacetate. Combustion analyses showed the crystals to contain: carbon, 40.26% and 39.97%; hydrogen, 6.83% and 6.76%, which may be compared to the theoretical values calculated for $C_4H_8O_4$ of: carbon, 40.00%; hydrogen, 6.67%. The amount of the peroxide formed in comparison to the amount of oxygen absorbed, and all of the above data were consistent with the postulate that the structure of the peroxide is that of acetaldehyde hemiperacetate,

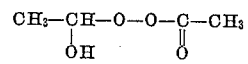

or of a compound of the same empirical composition.

In practice, isolation of the hemiperacetate is not generally desirable, since it is not stable on storage, and is most conveniently handled in solution. It does not dissociate in solution at any practical rate in the absence of a dissociation catalyst. Thus, the ultraviolet spectrum of a solution of the compound showed little or no aldehyde carbonyl and, therefore, little or no acetaldehyde present. In the presence of a basic catalyst, the rate of dissociation in solution is rapid but because the resulting solution of acetaldehyde and peracetic acid is not stable it is necessary to strip the acetaldehyde from the solution, The final solution of peracetic acid and a small amount of the catalyst is relatively stable and is suitable for practical use. If desired, stabilizing agents may be added.

Example 2

Acetaldehyde hemiperacetate (44 g.) prepared as described in Example 1, was dissolved at room temperature in 150 ml. of benzene. The solution was distilled under a column at 110 mm. Hg total pressure. The top temperature during the distillation was about 25° C. Acetaldehyde was removed overhead and the distillation was continued until benzene refluxed continuously in the head of the column. The resulting residual benzene solution of acetaldehyde hemiperacetate was free of acetaldehyde.

A solution of 0.5 g. of pyridine in 50 ml. of benzene was placed in the still pot of a second distilling column and the solution was refluxed at a total pressure of 108 mm. Hg. To this refluxing solution there was added during the course of 8 min. the benzene solution of acetaldehyde hemiperacetate prepared above. A slow reflux and take-off was maintained in the head during the entire addition. This reflux occurred at a temperature of about 25° C. A solution of peracetic acid in benzene remained in the still pot, the acetaldehyde by-product having been removed as overhead product. After standing 48 hrs. this solution in the still pot contained active oxygen equivalent to 58% of the hemiperacetate charged. A benzene solution of the hemiperacetate would have decomposed almost completely in 14 hrs. The benzene solution of peracetic acid obtained reacted with diphenylsulfide to form diphenylsulfoxide. This is a known reaction for peracetic acid. Diphenylsulfide did not react in the same way with the acetaldehyde hemiperacetate.

Example 3

A 4.4 molar solution of acetaldehyde in benzene was oxidized with oxygen at 0° C. until the active oxygen content of the solution was 6.7% by weight, calculated as acetaldehyde hemiperacetate. The excess acetaldehyde was then stripped off at 0° C., 100 mm. Hg. The resulting benzene solution of the hemiperacetate was added slowly to a solution of 1 ml. of pyridine in 50 ml. of benzene contained in a distillation vessel maintained at 0° C. under a pressure of 100 mm. Hg. During the addition, the by-product acetaldehyde was removed as overhead product as fast as it formed. After all the acetaldehyde had been removed, 5 g. of oleic acid was added to the residual solution of peracetic acid. The resulting mixture was agitated at 2° C. for 24 hrs., then poured into 300 ml. of ice water. The organic layer was separated, washed with water until free of acid and active oxygen, then dried over calcium sulfate. Solvent was removed from the solution by vacuum distillation, leaving an oily solid which was found to have an epoxide content of 15.9%, employing the method of King, Nature 164, 706 (1949). This corresponded to a yield of 9,10-epoxystearic acid of 12.8%, based on the oleic acid used.

The catalytic conversion of the acetaldehyde hemiperacetate to peracetic and acetaldehyde and the simultaneous removal of the latter from the reaction medium are preferably and most conveniently effected at temperatures of from about —5° C. to about 30° C. The operations can be carried out at higher temperatures, e. g. at the atmospheric boiling point of the solvent, e. g. 80° C. for benzene, or at lower temperatures, e. g. at —40° C. or lower. However, at such higher temperatures, more by-product acetic acid is formed with consequently smaller yields of peracetic acid. At such lower temperatures, more cooling capacity is required and operation is less convenient. The use of pressures less than atmospheric to maintain the desired temperature and to facilitate stripping out acetaldehyde is convenient and effective, but other methods can be employed. Thus, by-product acetaldehyde can be stripped out by passing an inert gas such as nitrogen through the solution of the catalyst to which the solution of the hemiperacetate is added.

The concentration of the catalyst in the mixture in which dissociation of the acetaldehyde hemiperacetate is effected should be sufficiently great to render the mixture distinctly basic. Most generally, concentrations of the catalyst will be about 0.01 to 5% by weight of the mixture, the preferred range being 0.1 to 5%. Higher concentrations, e. g. up to 10% or more, can be used but do not result in any added advantage.

Any basic material can be employed as the catalyst for effecting the conversion of the acetaldehyde hemiperacetate to peracetic acid and acetaldehyde. Examples are the inorganic bases such as the alkali metal and alkaline earth metal hydroxides and carbonates, the acetates of strong bases such as sodium and potassium hydroxides, and the organic bases. It is preferred to employ bases which are at least partially soluble in the reaction medium in view of which the organic bases such as pyridine, the alkyl substituted pyridines, the tertiary alkyl amines and the quaternary ammonium bases constitute a preferred class. Other bases are ammonia and the primary and secondary amines. Some of these organic bases may react with peracetic acid under the conditions of use to form N-oxide bases which are operable. Examples of N-oxide bases are the N-oxides of trimethylamine and pyridine.

Any non-aqueous liquid which is inert under the conditions of use to the hemiperacetate, the reaction products and the catalyst can be used as the reaction medium in effecting the conversion of the hemiperacetate to peracetic acid. Suitable solvents include benzene and simple alkyl derivatives of benzene such as toluene, the xylenes and ethyl benzene; saturated aliphatic hydrocarbons such as hexane, heptane, octane and petroleum ether; and various fluorinated hydrocarbons and chlorinated hydrocarbons. The amount of solvent employed should be sufficient to permit adequate temperature control under the conditions of use but otherwise is not critical. Ordinarily, about 2 to 25 parts of the solvent per part by weight of the hemiperacetate to be converted will be satisfactory, 4 to about 7 parts of solvent per part of hemiperacetate being preferred.

The acetaldehyde hemiperacetate to be used in practicing the invention can be made by any desired method, e. g. by the autoxidation of acetaldehyde using methods described in the literature. Such autoxidation can be effected by reacting liquid acetaldehyde in the presence or absence of an inert solvent with gaseous oxygen, air or any other mixture of oxygen with an inert gas such as nitrogen. When a solvent for the acetaldehyde is used, a non-polar solvent such as benzene, toluene, the xylenes and the saturated aliphatic hydrocarbons such as hexane, heptane, octane and petroleum ether, is generally preferred. However, various polar solvents such as acetone and ethyl acetate can be used so long as they are inert under the conditions of use. Temperatures in the range —70° C. to about room temperature or somewhat higher can be used, the preferred temperatures being in the range of about —20 to 10° C.

Peracetic acid is useful for epoxidizing or hydroxylating organic compounds containing olefinic carbon to carbon double bonds. Thus, it can be used to convert cyclohexene to epoxycyclohexane and oleic acid to 9,10-epoxystearic acid. It is also useful as a bleaching agent, as a germicide, and for other purposes.

I claim:

1. The method of dissociating acetaldehyde hemiperacetate to peracetic acid comprising subjecting said hemiperacetate to the action of a base.

2. The method for producing peracetic acid comprising catalyzing the dissociation of acetaldehyde hemiperacetate to peracetic acid and acetaldehyde by subjecting said hemiperacetate to the action of a basic substance and removing acetaldehyde from the reaction mixture substantially as fast as it is formed.

3. The method of claim 2 wherein a solution of the hemiperacetate in an inert solvent is fed to a solution of the basic substance in an inert solvent while simultaneously distilling acetaldehyde from the resulting mixture.

4. The method of producing peracetic acid comprising continuously feeding a solution of acetaldehyde hemiperacetate in an inert solvent to a solution of a basic substance in an inert solvent while maintaining said last named solution at a temperature not higher than about 80° C. and while continuously distilling acetaldehyde therefrom substantially as fast as it is formed therein, thereby leaving a solution of peracetic acid as the still residue.

5. The method of claim 4 wherein the temperature is —5 to 30° C.

6. The method of claim 4 wherein the basic substance is an organic base and its concentration in the solution from which acetaldehyde is distilled is in the range 0.01 to 10% by weight.

7. The method of claim 6 wherein the concentration of the base is 0.1 to 5% by weight.

8. The method of claim 6 wherein the organic base is pyridine.

References Cited in the file of this patent

UNITED STATES PATENTS

| | | |
|---|---|---|
| 1,179,421 | Galitzenstein et al. | Apr. 18, 1916 |
| 2,314,385 | Bludworth | Mar. 23, 1943 |

FOREIGN PATENTS

| | | |
|---|---|---|
| 272,738 | Germany | Apr. 6, 1914 |
| 730,116 | Germany | Mar. 19, 1943 |
| 226,012 | Switzerland | June 16, 1943 |

OTHER REFERENCES

Findley et al.: J. Am. Chem. Soc., vol. 67 (1945), pp. 412–14.

Swern: Chem. Reviews, vol. 45 (1949), pages 5 to 8.

Conant et al.: The Chemistry of Organic Compounds, 4th ed., The Macmillan Co., pp. 161-2 (1952).

Tobolsky et al.: Organic Peroxides; Interscience Publishers, Inc., pages 35 and 36 (1954).